United States Patent
Biedendorf

(10) Patent No.: US 6,396,055 B1
(45) Date of Patent: May 28, 2002

(54) DISPLAY SCREEN FOR AN IMAGE-FORMING TUBE IN A TELEVISION OR MONITOR AND PRESS APPARATUS FOR MAKING SAME

(75) Inventor: Ralf Biedendorf, Bingen (DE)

(73) Assignee: Schott Glas, Mainz (DE)

( * ) Notice: Subject to any disclaimer, the term of this patent is extended or adjusted under 35 U.S.C. 154(b) by 78 days.

(21) Appl. No.: 09/650,836

(22) Filed: Aug. 30, 2000

(30) Foreign Application Priority Data

Sep. 1, 1999 (DE) .......................................... 199 41 571

(51) Int. Cl.⁷ .................................................. H01J 5/02
(52) U.S. Cl. ......................................... 250/239; 250/216
(58) Field of Search ................................. 250/239, 216, 250/208.1; 345/5, 7, 8, 11; 313/364, 461

(56) References Cited

U.S. PATENT DOCUMENTS 5,364,673 A * 11/1994 Schmidt et al. ................. 428/34

FOREIGN PATENT DOCUMENTS

| DE | 34 43 498 A1 | 6/1985 |
| DE | 94 03 635 U | 6/1994 |
| DE | 198 23 710 A1 | 12/1998 |
| FR | 2 096 160 A | 2/1972 |

* cited by examiner

Primary Examiner—Que T. Le
(74) Attorney, Agent, or Firm—Michael J. Striker

(57) ABSTRACT

The flat display screen for an image-forming tube consists of a front pane portion (2,2') and a circumferential flange portion (3,3'). The flange portion has an outer surface with a circumferential solder edge (7,7') on an end of the circumferential flange portion (3,3') on an opposite side from the front pane portion (2,2'). The outer surface has a circumferential ring-shaped region (5,5'), designated a KC surface, which extends substantially parallel to a central axis (8,8'), which is perpendicular to a surface of the front pane portion (2,2') passing through a center point on the front pane portion (2,2'). So that the flange portion height can be reduced without increasing the danger of implosion, the wall thickness of the circumferential flange portion (3,3') of the outer surface between the solder edge (7,7) and the circumferential ring-shaped region (5,5') is greater than a wall thickness of the circumferential flange portion in the circumferential ring-shaped region (5,5'). In a preferred embodiment the solder edge (7,7') has a width that is less than the wall thickness of the flange portion (3,3') between said solder edge (7,7') and the circumferential ring-shaped region (5,5'). A pressing tool (10,10') for making the display screen is also described.

11 Claims, 3 Drawing Sheets

DISPLAY SCREEN FOR AN IMAGE-FORMING TUBE IN A TELEVISION OR MONITOR AND PRESS APPARATUS FOR MAKING SAME

BACKGROUND OF THE INVENTION

1. Field of the Invention

The present invention relates to a display screen, which includes a front pane portion and a circumferential flange portion, whose outer surface includes a circumferential ring-shaped region, designated in the following as a KC surface, which extends substantially parallel to a central longitudinal axis that is perpendicular to a surface passing through a center point of the front pane portion. A circumferential solder edge is located on an opposite side of the flange portion from the front pane portion. The invention also relates to an apparatus including a press tool for making the display screen according to the invention.

2. Prior Art

A display screen of the above-described type comprising a front pane portion and a circumferential flange portion with an outer surface having the KC surface and a solder edge is known from DE 34 43 498 A1.

An apparatus for making the known display screen is described in DE 198 23 710 A1. This apparatus includes a press tool comprising an upper die, a lower molding part and a neck ring that rests on the lower molding part.

Display screens are required for making cathode ray tubes, which are used for example in televisions or monitors. The principal parts of the image-forming tube are the display screen, a funnel, a slot mask in the case of color forming tubes, an electron gun for forming an electron beam, a deflection device for the electron beam and an implosion-protecting frame.

In the course of the manufacturing process of an image-forming tube solder glass is applied to the solder surface that contacts the opposing surface of the funnel. To connect the funnel with the display screen, which both are made of glass, the funnel is inserted with its neck pointing down in a frame and the display screen is placed with its solder surface formed on the peripheral frame on it. After that both parts are transported through a tunnel oven in which the glass solder is melted. By its own weight the display screen distributes the melted solder glass uniformly between the bearing surfaces. After cooling the screen and funnel are rigidly connected with each other. Subsequently the electron beam system is bonded onto the funnel neck.

Cathode ray tubes must be operate with a high vacuum. In order to produce this high vacuum, the image-forming tubes are heated in another tunnel oven to 350° C. and pumped out through their still open neck to empty them of the air inside them. After the end of this process step, which lasts about 2 ½ hours, the funnel neck is melted to close it. Because of this evacuation of the funnel tube the display screen is strongly stressed or loaded by the surrounding air pressure. The display screen is slightly deformed about a few tenths of a millimeter by this pressure. In order to stabilize the screen and thus to protect the image-forming tube effectively from implosion, a steel frame is provided around the outside on the screen frame. Furthermore this steel frame is heated inductively to 450° C. and the image-forming tube is pushed in this frame. Finally the deflection device is put on the funnel neck.

The display screens are pressed from glass material. The pressing process is illustrated in FIG. 6, which shows a conventional pressing tool 10. The pressing tool 10 comprises an upper die 11, a lower mold part 13 and a neck ring 12. A glass portion 16 is dropped into the mold formed by the neck ring 12 and the lower mold part 13 and is brought to the desired shape with the upper die 11. The circumferential surface (also designated the KC surface), on which the implosion-protecting frame is mounted in the finished display screen, is formed by the inner surface 14 of the neck ring 12.

At the positions, on which the lower mold part 13 and the neck ring 12 bear on each other, both parts do not ideally fit snugly on each other. A mold seam at this location is a manifestation of this situation in the pressed display screen. This mold seam can be formed as an offset, wherein either the upper part or the lower part protrudes, or as a pressed out region, i.e. a circumferential bulge.

A conventional display screen is shown in FIG. 5. The display screen I has a convex front pane portion 2 and a circumferential flange portion 3, on which a KC surface 5 is formed, which extends parallel to a central axis 8 of the front pane 2. The circumferential flange portion 3 has a mold seam 4 on its lower edge. Display screens which are designated as flat have a radius of curvature of less than 10 m. Display screens which have a radius of curvature greater than that are designated as convex display screens.

Flat front pane portions 2, i.e. flat display screens, are of increasing importance, because the trend is to ever flatter televisions and monitors. One problem with the flat front display screen is that its reduced curvature makes it less resistant to elevated pressures and increases the implosion danger in comparison to curved front pane portions. The implosion danger is usually reduced in the art by increasing the height of the circumferential flange portion so that the flange portion can take the additional stresses. The disadvantage of this method is that the degree of flatness that one has obtained by making the front pane portion flatter in the finished television or monitor is lost again because of the larger display screen flange portion.

SUMMARY OF THE INVENTION

It is an object of the present invention to provide an improved display screen which can be used to build a flatter television or monitor than currently known in the art, without increasing the implosion danger.

It is an additional object of the present invention to provide an apparatus for making the improved display screen, from which the flatter television or monitor is constructed.

These objects, and others which will be made more apparent hereinafter, are attained in a display screen for an imaging-forming tube of a television or monitor comprising a front pane portion and a circumferential flange portion, the flange portion having an outer surface and a circumferential solder edge on an end of the circumferential flange portion opposite from the front pane portion.

According to the invention the outer surface of the flange portion has a circumferential ring-shaped region, designated a KC surface, the circumferential ring-shaped region of the outer surface extends substantially parallel to a central axis, which is perpendicular to a surface of the front pane portion passing through a center point on the front pane portion; and a part of the circumferential flange portion between the solder edge and the circumferential ring-shaped region has a wall thickness that is greater than a wall thickness of the circumferential flange portion in the circumferential ring-shaped region.

The above objects are also attained in an apparatus for making the display screen comprising a pressing tool for pressing a glass portion to form the display screen, the pressing tool including a lower mold part having an interior space for the glass portion, a neck ring resting on the upper edge of the lower mold part and an upper die that is insertable into the interior space of the lower mold part through the neck ring in order to shape the glass portion.

According to one embodiment of the invention neck ring has an interior radially widened cavity that is wider than the interior space of the lower mold part, which forms or molds the part of the circumferential flange portion between the solder edge and the circumferential ring-shaped region having the wall thickness that is greater than the wall thickness of the circumferential flange portion in the circumferential ring-shaped region.

According to another embodiment of the invention a radially widened portion of the interior space of the lower mold part that is wider than a remaining portion of interior space is provided at the upper edge of the lower mold part. This radially widened portion of the lower mold part together with the lower part of the neck ring forms or molds the part of the circumferential flange portion between the solder edge and the circumferential ring-shaped region having the wall thickness that is greater than the wall thickness of the circumferential flange portion in the circumferential ring-shaped region.

The additional material extending peripherally from the display screen frame according to the invention traps or captures the stresses and strains, which fit result from increasing the curvature radius of the front pane portion of the display be screen so that the height of the flange portion of the display screen can still be reduced with arched front pane portions. Because of that the televisions or monitors made with the display screens according to the invention can be flatter than the prior art televisions or monitors provided with flat display screens, without increasing the danger of implosion. Also the height of the display screen frame of the convex or arched display screens can also be reduced in this same way.

The apparent disadvantage that the lateral extent of the flange portion of the display screen is increased and thus the lateral extent of the television or flat display screen made from it is correspondingly increased is not a real disadvantage, since the implosion-protecting frame which is pushed on the KC surface of the display screen is provided with eyes, which would lead without more to a larger lateral extent of the television or monitor than that of the display screen itself.

A retaining connection between the display screen and the funnel is made possible by means of the comparatively reduced wall thickness of the flange portion at the solder edge. The width of the solder edge of the display screen corresponds to the width of the funnel solder edge, a meniscus forms from the solder glass on melting and the solder seam is retainable.

In a preferred embodiment a circumferential projecting portion provides the widening of the flange portion between the solder edge and the KC surface, since this is advantageous from a manufacturing engineering standpoint.

The apparatus for making the display screen according to the invention comprises a lower mold part and a neck ring which alone form the KC surface of the display screen. The KC surface is formed by the lower mold part alone. The neck ring exclusively forms the flange portion on the side of the KC surface facing away or opposite from the front pane portion. Since the display screen flange portion next to the KC surface must be widened, an interior hollow cavity provided in the neck ring is advantageously wider than the interior hollow space provided in the lower mold part in a preferred embodiment.

The above-described regions of the press tool interior surfaces extend over several millimeters to centimeters.

In an additional outstanding embodiment of the apparatus according to the invention for making the display screen the widened or broadened part of the flange portion is formed with the lower mold part. The solder edge is generally formed in both embodiments by means of the neck ring.

The apparatus for making the display screen according to the invention has the additional advantage that the mold seam is formed on the side of the KC surface opposite to the front pane portion so that it is now possible to assemble. the implosion-protecting frame on it without the display screen being damaged by residual material remaining at the mold seam. Also the production of tears and cracks by forcing on the implosion-protecting frame at the mold seam is avoided so that the waste during the production process is reduced. Because of that the production costs are correspondingly reduced. The display screen provides the advantage for the end user that the implosion danger of the finished image-forming tube is less than with the prior art image-forming tubes.

In a preferred embodiment the interior surface of the lower mold part forming the KC surface is gently inclined away from the central longitudinal axis of the upper die. On cooling the glass is cast so that the KC surface becomes comparatively exactly parallel to the central longitudinal axis of the upper die and the implosion-protecting frame is more easily fixed and assembled with the display screen.

BRIEF DESCRIPTION OF THE DRAWING

The objects, features and advantages of the invention will now be illustrated in more detail with the aid of the following description of the preferred, embodiments, with reference to the accompanying figures in which.

DESCRIPTION OF THE PREFERRED EMBODIMENTS

Figure 1:
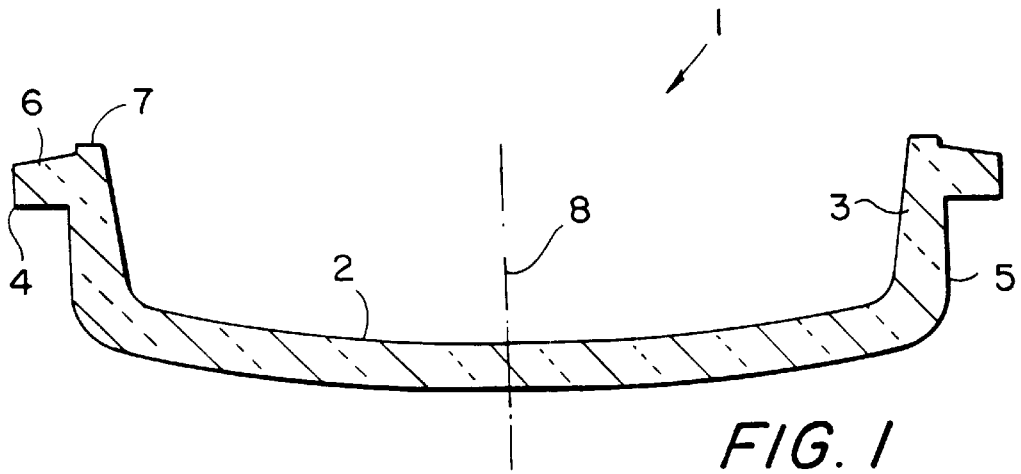
FIG. 1 is a cross-sectional view through a first embodiment of the display screen according to the invention.

The display screen shown in FIG. 1 consists of a front pane portion 2 and a peripheral or circumferential flange portion 3. The flange portion 3 has a KC surface 5. The "KC surface" 5 is a circumferential ring-shaped portion or region of the outer surface of the flange portion 3, which extends substantially parallel to the central axis 8 of the display screen. The central axis 8 is perpendicular to a surface passing through a center point of the front pane portion 2. An unshown implosion-protecting frame can be pressed on this KC surface 5. A circumferential projecting portion 6 of the flange portion 3 adjoins the KC surface on the side opposite from the front pane 2. The projecting portion 6 of the flange portion 3 extends up to a circumferential solder edge 7, to which solder glass is applied, in order to bond the display screen with a funnel. The wall thickness of the flange portion 3 in the vicinity of the solder edge 7 is less than the wall thickness of the projecting portion 6.

Figure 2:
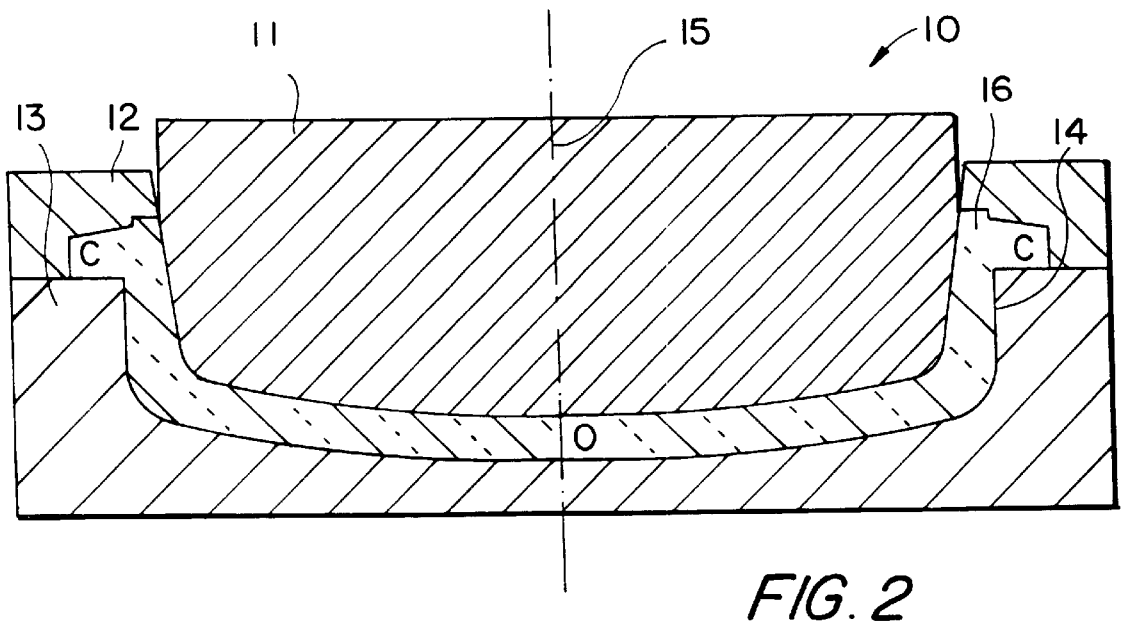
FIG. 2 is a cross-sectional view through a first embodiment of the pressing tool for pressing the display screen according to the invention.

A pressing tool 10 for pressing the display screen 1 of FIG. 1 is shown in FIG. 2. This pressing tool 10 comprises a lower mold part 13 that is shaped like a pan or cup and has an interior space O, a neck ring 12 that rests on the lower mold part 13 and an upper die 11 that is insertable through the neck ring to press and form a glass portion 16 in the lower mold part. The particular shape, into which the glass portion 16 is molded, is formed by the neck ring 12 and the lower mold part 13. The upper die 11 is inserted in the arrow direction in the mold formed by the neck ring 12 and the lower mold part 13. The glass portion 16 is then pressed by the upper die 11 so that it takes the shape of the display screen 1.

The lower mold part 13 is formed so that its inner surface has a ring region 14, which is parallel to the central longitudinal axis 15 of the upper die 11. This ring region 14 is found on the part of the lower mold part 13 on which the neck ring 12 bears and forms the KC surface 5 of the display screen 1.

The neck ring 12 is formed in the embodiment shown in FIG. 2 with a radially widened cavity C which forms the projecting portion 6 of the display screen flange portion 3 and the solder edge 7. The radially widened interior cavity C is wider than then interior space O provided in the lower mold part 13.

The neck ring 12 and the lower mold part 13 ideally do not fit snugly or flush with each other so that a small slot forms at the transition between them, in which glass is pressed. The small slot manifests itself in the formation of a mold seam 4 in the finished display screen. This mold seam 4 is located in the finished display screen 1 at the transition between the KC surface 5 and the projecting portion 6 of the display screen flange portion 3.

Figure 3:
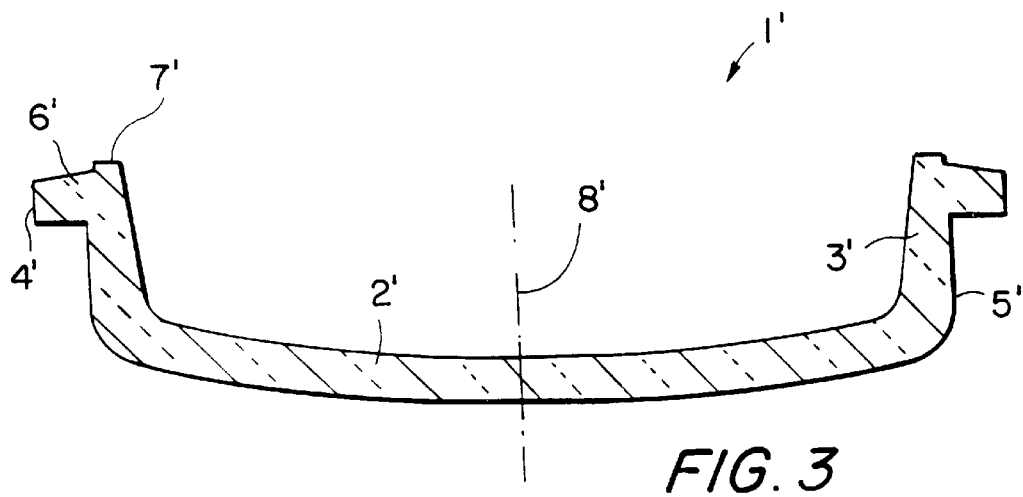
FIG. 3 is a cross-sectional through another embodiment of the display screen according to the invention.
Figure 4:
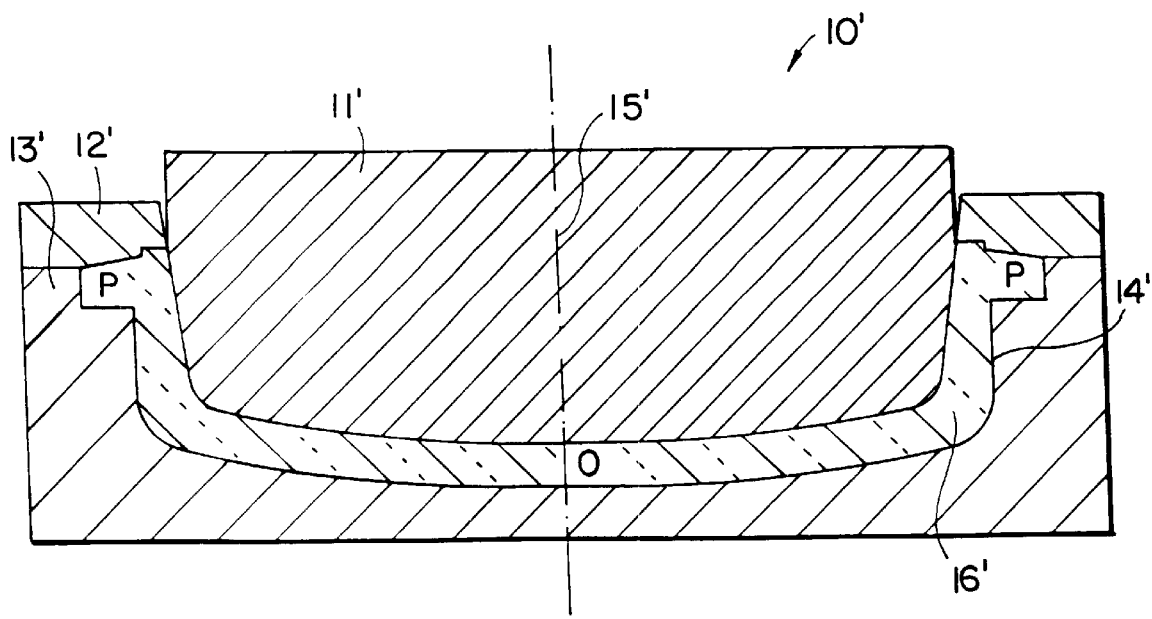
FIG. 4 is a cross-sectional view through another embodiment of the pressing tool for pressing the display screen according to the invention.
Figure 5:
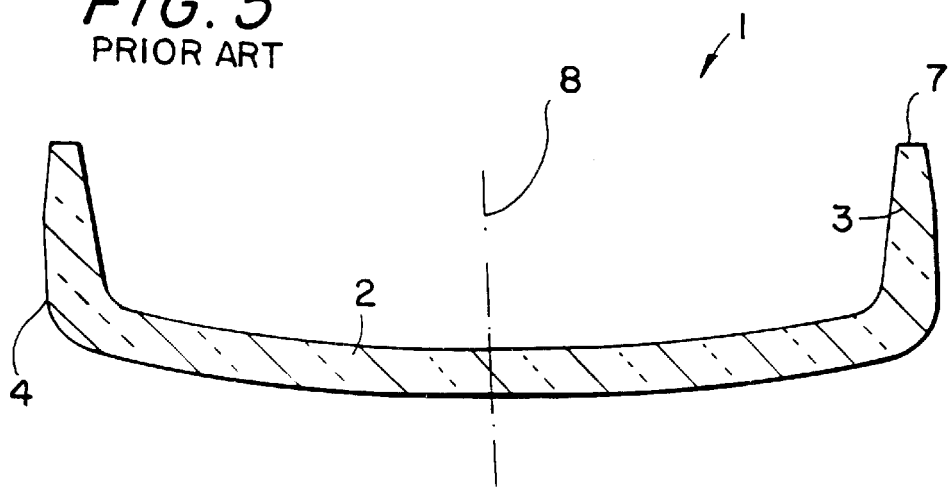
FIG. 5 is a cross-sectional view through a display screen of the prior art.
Figure 6:
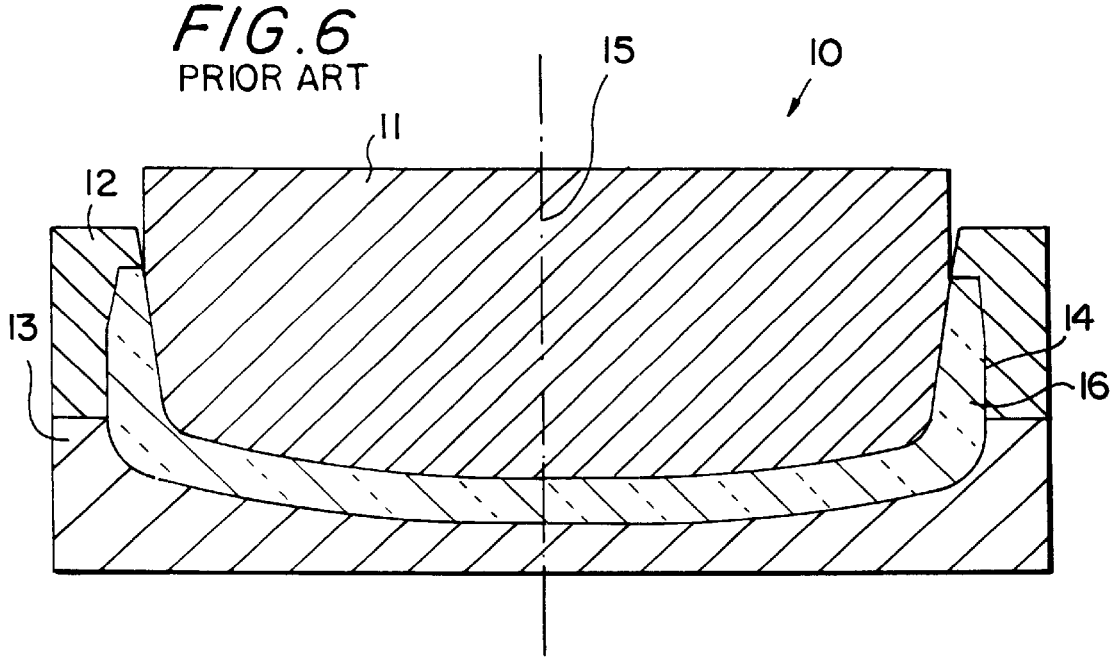
FIG. 6 is a cross-sectional view through a prior art pressing tool for the display screen shown in FIG. 5.

In FIG.3 an additional embodiment of the display screen 1' is shown, which is made by means of the press apparatus 10' shown in FIG. 4. In pressing not only the KC surface 5' is formed by the lower mold part 13', but also the projecting portion 6'. The difference in the finished display screen 1' is that the mold seam 4' is now located on the upper edge of the projecting portion 6' of the flange portion.

In the embodiment shown in FIG. 4 the press tool 10' comprises the lower mold part 13' with an interior space O, the neck ring 12' that rests on the upper edge of the lower mold part 13' and the upper die 11' that is shaped to form the glass portion 16' when it is inserted through the neck ring 12'. In this embodiment in contrast to the previous embodiment the interior space O of the lower mold part 13' has an upper widened portion P, which, in this embodiment, forms the projecting portion 6' of the flange portion 3' together with the lower part of the neck ring 12'. The solder edge 7' however is still formed by the neck ring 12'.

The interior surface region 14' of the lower mold part 13' is inclined away from the longitudinal axis 15' of the upper die 11' at an angle α of from 0.5° to 2°, preferably 10°, in order to obtain a perpendicular KC surface 5' after cooling.

The disclosure in German Patent Application 199 41 571.4-33 of Sep. 1, 1999 is incorporated here by reference.

This German Patent Application describes the invention described hereinabove and claimed in the claims appended hereinbelow and provides the basis for a claim of priority for the instant invention under 35 U.S.C. 119.

While the invention has been illustrated and described as embodied in a display screen and a press apparatus for making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A dislay screen for an image-forming tube of a television or a monitor, wherein said display screen has a central axis (8,8') and comprises a front pane portion (2,2') and a circumferential flange portion (3,3'), said circumferential flange portion (3,3') having an outer surface and a circumferential solder edge (7,7') on an end of the circumferential flange portion (3,3') on an opposite side from the front pane portion (2,2');

wherein said outer surface of the flange portion (3,3') has a circumferential ring-shaped region (5,5') consisting of a KC surface, said circumferential ring-shaped region (5,5') extends substantially parallel to said central axis (8,8'), said central axis (8,8') is perpendicular to a surface of the front pane portion (2,2') passing through a center point on the front pane portion (2,2'); and wherein a part of the circumferential flange portion (3,3') extending between said solder edge (7,7') and said circumferential ring-shaped region (5,5') has a wall thickness greater than a wall thickness of the circumferential flange portion in said circumferential ring-shaped region (5,5').

2. The display screen as claimed in claim 1, wherein the solder edge (7,7') has a width less than said wall thickness of said flange portion (3,3') extending between said solder edge (7,7') and said circumferential ring-shaped region (5,5').

3. The display screen as claimed in claim 1 or 2, wherein said flange portion (3,3') between said solder edge (7,7') and said circumferential ring-shaped region (5,5') includes an outwardly extending peripherally projecting portion (6,6').

4. A press apparatus for making a display screen for an image-forming tube from a glass portion, said display screen having a central axis (8) and comprising a front pane portion (2) and a circumferential flange portion (3), said circumferential flange portion (3) having an outer surface and a circumferential solder edge (7) on an end of the circumferential flange portion (3) opposite from the front pane portion (2); wherein said outer surface has a circumferential ring-shaped region (5) consisting of a KC surface, said circumferential ring-shaped region (5) extends substantially parallel to said central axis (8), said central axis (8) is perpendicular to a surface of the front pane portion (2) passing through a center point on the front pane portion (2); and wherein a part of the circumferential flange portion extending between said solder edge (7) and said circumferential ring-shaped region (5) has a wall thickness greater than a wall thickness of the circumferential flange portion in said circumferential ring-shaped region (5); said apparatus comprising a press tool (10) including a lower mold part (13), an upper die (11) and a neck ring (12) bearing on the lower mold part (13);

wherein the lower mold part (13) has an inner surface on an annular circumferential region (14) adjacent to the neck ring (12) and said inner surface of the lower mold part (13) is approximately parallel to a longitudinal axis (15) of the upper die (11); and wherein two diametrically opposing points on said inner surface of said lower mold part (13) on opposite sides of said lower mold part are spaced a distance from each other not equal to a distance of two diametrically opposing points on an inner surface of the neck ring (12) in a neck ring region adjacent to the lower mold part (13).

5. The press apparatus as defined in claim 4, wherein said distance between said two diametrically opposing points on said inner surface of said lower mold part (13) on said opposite sides of said lower mold part is less than said distance of said two diametrically opposing points on said inner surface of the neck ring (12) in said neck ring region adjacent to the lower mold part (13).

6. A press apparatus for making a display screen for an image-forming tube from a glass portion, said display screen having a central axis (8') and comprising a front pane portion (2') and a circumferential flange portion (3'), said circumferential flange portion (3') having an outer surface and a circumferential solder edge (7') on an end of the circumferential flange portion (3') opposite from the front pane portion (2'); wherein said outer surface has a circumferential ring-shaped region (5') consisting of a KC surface, said circumferential ring-shaped region (5') extends substantially parallel to said central axis (8'), said central axis (8') is perpendicular to a surface of the front pane portion (2') passing through a center point on the front pane portion (2'); and wherein a part of the circumferential flange portion between said solder edge (7') and said circumferential ring-shaped region (5') has a wall thickness that is greater than a wall thickness of the circumferential flange portion in said circumferential ring-shaped region (5'); said apparatus comprising a press tool (10') including a lower mold part (13'), an upper die (11') and a neck ring (12') bearing on the lower mold part (13');

wherein the lower mold part (13') has an inner surface on an annular circumferential region (14') and said inner surface is spaced a predetermined distance from the neck ring (12') and approximately parallel to a central longitudinal axis (15') of the upper die (11').

7. The press apparatus as defined in claim 6, wherein two diametrically opposing points on said inner surface of said lower mold part (13') in said annular circumferential region (14') spaced from said neck ring (12) are spaced a distance from each other less than a distance between two diametrically opposing points on said inner surface of said lower mold part (13') in another circumferential region of the lower mold part (13') adjoining said neck ring (12').

8. The press apparatus as defined in claim 4, wherein said inner surface of said lower mold part (13) is inclined away from said central longitudinal axis (15) of said upper die (11) at an angle of from 0.5° to 2° in said annular circumferential region (14) of said neck ring.

9. The press apparatus as defined in claim 6, wherein said inner surface of said lower mold part (13') is inclined away from said central longitudinal axis (15') of said upper die (11') at an angle of from 0.5° to 2° in said annular circumferential region (14') of said neck ring.

10. A press apparatus for making a display screen from a glass portion, said display screen having a central axis (8) and comprising a front pane portion (2) and a circumferential flange portion (3), said circumferential flange portion (3) having an outer surface and a circumferential solder edge (7) on an end of the circumferential flange portion (3) opposite from the front pane portion (2); wherein said outer surface has a circumferential ring-shaped region (5) consisting of a KC surface, said circumferential ring-shaped region (5) extends substantially parallel to said central axis (8), said central axis (8) is perpendicular to a surface of the front pane portion (2) passing through a center point on the front pane portion (2); and wherein a part of the circumferential flange portion extending between said solder edge (7) and said circumferential ring-shaped region (5) has a wall thickness greater than a wall thickness of the circumferential flange portion in said circumferential ring-shaped region (5);

wherein said apparatus comprises a press tool (10) including a lower mold part (13) having an interior space (O) for the glass portion, a neck ring (12) provided with an interior radially extending cavity (C) and bearing on the lower mold part (13) and an upper die (11) insertable through the neck ring (12) to shape the glass portion;

wherein the interior radially extending cavity (C) is wider than the interior space (O) in the lower mold part (13), whereby said interior radially extending cavity (C) forms said part of the circumferential flange portion extending between said solder edge (7) and said circumferential ring-shaped region (5) and having said wall thickness greater than said wall thickness of the circumferential flange portion in said circumferential ring-shaped region (5).

11. A press apparatus for making a display screen from a glass portion, said display screen having a central axis (8') and comprising a front pane portion (2') and a circumferential flange portion (3'), said circumferential flange portion (3') having an outer surface and a circumferential solder edge (7') on an end of the circumferential flange portion (3') opposite from the front pane portion (2'); wherein said outer surface has a circumferential ring-shaped region (5') consisting of a KC surface, said circumferential ring-shaped region (5') extends substantially parallel to said central axis (8'), said central axis (8') is perpendicular to a surface of the front pane portion (2') passing through a center point on the front pane portion (2'); and wherein a part of the circumferential flange portion between said solder edge (7') and said circumferential ring-shaped region (5') has a wall thickness that is greater than a wall thickness of the circumferential flange portion in said circumferential ring-shaped region (5');

wherein said apparatus comprises a press tool (10') including a lower mold part (13') having an interior space (O) for the glass portion, a neck ring (12') bearing on the lower mold part (13') and an upper die (11') insertable through the neck ring (12') to shape the glass portion, said interior space (O) of the lower mold part (13') being provided with a radially widened portion (P) adjacent to the neck ring (12');

wherein the radially widened portion (P) is wider than a remaining portion of the interior space (O) in the lower mold part (13'), whereby said radially widened portion (P) together with a lower part of the neck ring (12') forms said part of the circumferential flange portion extending between said solder edge (7') and said circumferential ring-shaped region (5') and having said wall thickness greater than said wall thickness of the circumferential flange portion in said circumferential ring-shaped region (5').

\* \* \* \* \*